United States Patent
Ho et al.

(10) Patent No.: US 9,280,217 B2
(45) Date of Patent: Mar. 8, 2016

(54) CAPACITIVE POINTER

(71) Applicant: WALTOP INTERNATIONAL CORPORATION, Hsinchu (TW)

(72) Inventors: Yu Chiehmr Ho, Hsinchu (TW); Chia-Jui Yeh, Taipei (TW)

(73) Assignee: Waltop International Corporation, Hsinchu (TW)

( * ) Notice: Subject to any disclaimer, the term of this patent is extended or adjusted under 35 U.S.C. 154(b) by 0 days.

(21) Appl. No.: 14/491,818

(22) Filed: Sep. 19, 2014

(65) Prior Publication Data
US 2015/0378456 A1 Dec. 31, 2015

(30) Foreign Application Priority Data
Jun. 27, 2014 (TW) .............................. 103122254 A

(51) Int. Cl.
  *G06F 3/045* (2006.01)
  *G06F 3/0354* (2013.01)
  *G06F 3/044* (2006.01)

(52) U.S. Cl.
  CPC ............ *G06F 3/03545* (2013.01); *G06F 3/044* (2013.01)

(58) Field of Classification Search
  CPC .............................. G06F 3/03545; G06F 3/044
  See application file for complete search history.

(56) References Cited

U.S. PATENT DOCUMENTS

| 4,532,376 | A | * | 7/1985 | Rockwell | ............... | H01H 13/50 178/19.01 |
| 5,541,375 | A | * | 7/1996 | Dam | ................... | G06F 3/03545 178/19.01 |
| 5,576,502 | A | * | 11/1996 | Fukushima | ......... | G06F 3/03545 178/19.01 |
| 6,252,182 | B1 | * | 6/2001 | Lai | ....................... | G06F 3/03545 178/19.04 |
| 7,643,016 | B2 | * | 1/2010 | Ake | ..................... | G06F 3/03545 178/18.01 |
| 2005/0122319 | A1 | * | 6/2005 | Sakurai | ............... | G06F 3/03545 345/179 |
| 2007/0025805 | A1 | * | 2/2007 | Lapstun | ................ | B43K 7/005 401/195 |
| 2008/0030486 | A1 | * | 2/2008 | Cook | .................. | G06F 3/03545 345/179 |
| 2008/0257613 | A1 | * | 10/2008 | Katsurahira | ........ | G06F 3/03545 178/19.04 |
| 2012/0331546 | A1 | * | 12/2012 | Falkenburg | ......... | G06F 3/03545 726/16 |
| 2015/0116287 | A1 | * | 4/2015 | Yeh | ....................... | B43K 8/003 345/179 |

FOREIGN PATENT DOCUMENTS

| JP | 6-65928 | 9/1994 |
| JP | 11-249798 | 9/1999 |
| JP | 2010129920 A | 6/2010 |
| JP | 2013161307 A | 8/2013 |
| JP | 2013222268 A | 10/2013 |

* cited by examiner

*Primary Examiner* — Joe H Cheng
(74) *Attorney, Agent, or Firm* — Donald E. Stout; Stout, Uxa & Buyan, LLP

(57) ABSTRACT

A capacitive pointer is disclosed. The capacitive pointer comprises a refill, a refill holder, a spring, a control board, a force sensor, an upper shielding, a lower shielding, a tip cover and a battery. The refill comprises a conductor and penetrates through the refill holder. The spring surrounds one end of the refill holder. The refill holder and the spring electrically connect the control board. The force sensor is located on one end of the control board. The refill and the refill holder press the spring to contact the force sensor to detect the pressure force against the refill. The upper shielding and the lower shielding combine to cover the refill, the refill holder and the spring. The tip cover surrounds one end of the refill and the upper shielding and the lower shielding and electrically connects to the control board. The battery provides the capacitive pointer with electrical power.

10 Claims, 5 Drawing Sheets

CAPACITIVE POINTER

FIELD OF THE INVENTION

The present invention relates to a pointer, and more particularly to a capacitive pointer.

DESCRIPTION OF THE PRIOR ART

Capacitive touch input technology has been widely applied in touch panel. Capacitive touch input technology has advantages of allowing the use of variety of touch sources such as an user's finger(s) for input operation and multi-touch gestures for various operations and functions. Various applications can be assigned corresponding to multi-touch gestures. However, capacitive touch input technology lacks input functions with a pointer such as a stylus or pen. Performing touch control input by a pointer has advantages of convenient for writing, tip pressure level function, and certain sensing height. Thus the present invention provides a capacitive pointer which allow user to perform touch control functions with a pointer on a capacitive touch control panel.

SUMMARY OF THE INVENTION

An object of the present invention is to provide a capacitive pointer which allow user to perform touch control functions with a pointer on a capacitive touch control panel.

According to the object, one embodiment of the present invention provides a capacitive pointer. The capacitive pointer comprises a refill, a refill holder, a spring, a control board, a force sensor, an upper shielding, a lower shielding, a tip cover and a battery. The refill comprises a conductor and penetrates through the refill holder. The spring surrounds one end of the refill holder. The refill holder and the spring electrically connect the control board. The force sensor is located on one end of the control board. The refill and the refill holder press the spring to contact the force sensor to detect the pressure force against the refill. The upper shielding and the lower shielding combine to cover the refill, the refill holder and the spring. The tip cover surrounds one end of the refill and the upper shielding and the lower shielding and electrically connects to the control board. The battery provides the capacitive pointer with electrical power.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the scale of each component may not be expressly exactly.

Figure 1:
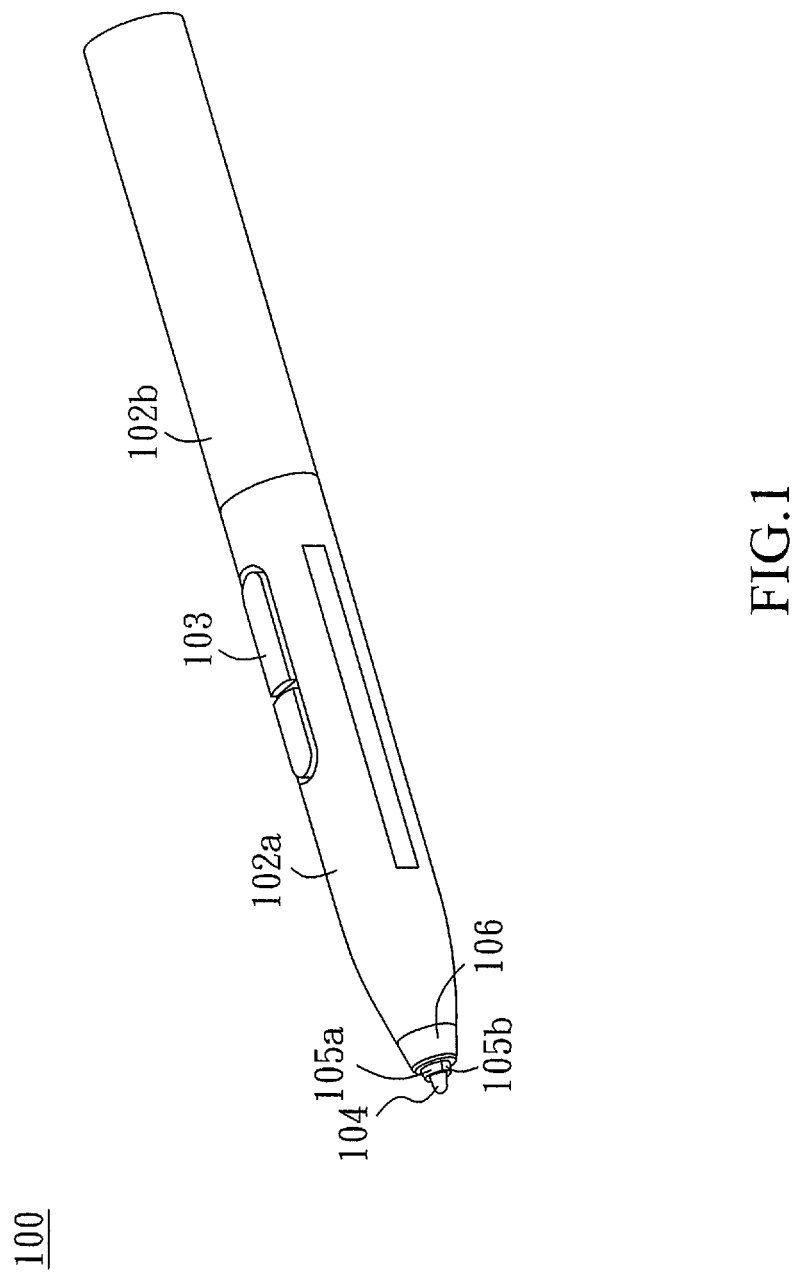
FIG. 1 shows a capacitive pointer according to one embodiment of the invention.

FIG. 1 shows a capacitive pointer according to one embodiment of the invention. The capacitive pointer 100 comprises a front tube 102a, a rear tube 102b, a button 103, a cap 104, a cover 105a, a control board holder 105b and a tip cover 106. The materials of front tube 102a, the button 103, the cover 105a and the control board holder 105b comprise non-conductive materials comprising acrylonitrile butadiene styrene (ABS) and polycarbonate (PC). The materials of the rear tube 102b and the tip cover 106 comprise metal, such as aluminum. The materials of the cap 104 comprises polypropylene (PP). The capacitive pointer 100 of this embodiment of the invention will be further described in detail with FIG. 1A to FIG. 1C.

Figure 1A:
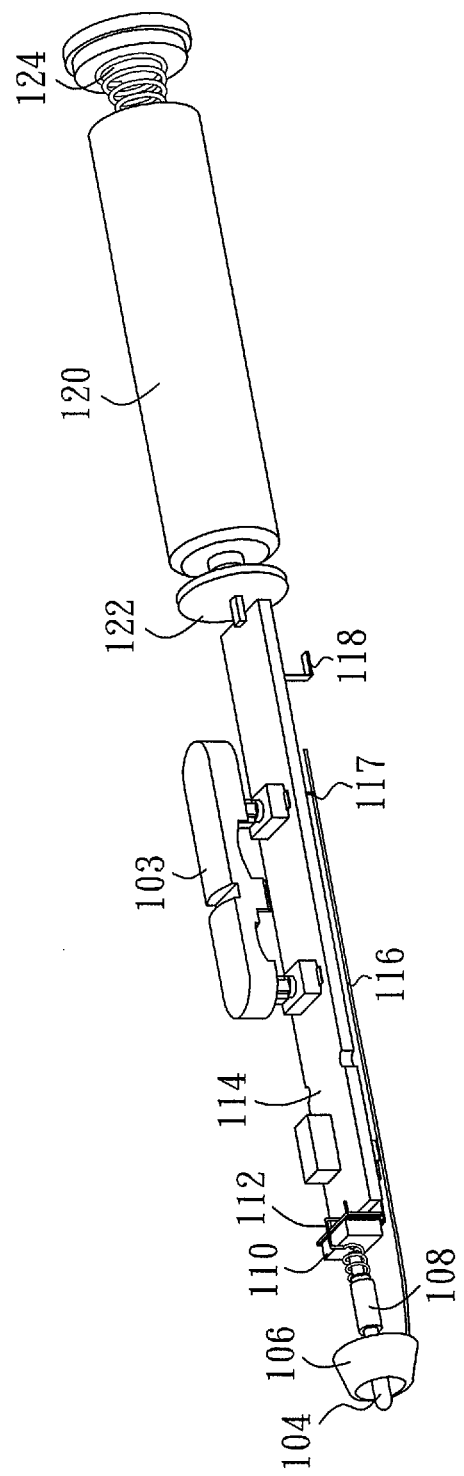
FIG. 1A shows inside structure of a capacitive pointer according to one embodiment of the invention.

FIG. 1A shows inside structure of a capacitive pointer according to one embodiment of the invention. The capacitive pointer 100 further comprises a refill holder 108, a force sensor 110, a spring 112, a control board 114, a tip cover conductive line 116, a tip cover elastic strip 117, a rear tube elastic strip 118, a battery 120, an anode elastic strip 122 and a rea cap 124 beside the cap 104, the button 103 and the tip cover 106 shown in FIG. 1. The rea cap 124 further comprises a cathode elastic strip. The force sensor 110 is soldered on a flexible printed circuit board (FPC). The flexible printed circuit board is electrically connected to the control board 114. The spring 112 surrounds one end of the refill holder 108, and bends to detour the force sensor 110. The spring 112 electrically connects the control board 114. The materials of the refill holder 108, the spring 112, the tip cover conductive line 116, the tip cover elastic strip 117, the rear tube elastic strip 118, the anode elastic strip 122 and the rea cap 124 comprise metal. The material of the refill holder 108 comprises aluminum. The materials of the spring 112, the tip cover conductive line 116, the anode elastic strip 122 and the rea cap 124 comprise steel. The materials of the tip cover elastic strip 117 and the rear tube elastic strip 118 comprise beryllium copper.

The tip cover 106, the tip cover conductive line 116 and the tip cover elastic strip 117 electrically connect the control board 114 to sense detection electrodes of a touch panel so as to calculate coordinates of the capacitive pointer 100. The force sensor 110 electrically connects the control board 114 so as to sense tip pressure of the capacitive pointer 100 applied upon the surface of touch panel to perform functions such as drawing or writing line width control via applying pressure on the force sensor 110 by the cap 104 and a refill, the refill holder 108 to change voltage or current. The spring 112 is used to make the refill and the refill holder 108 recoil back to original position. The refill, the refill holder 108 and the spring 112 electrically connect the control board 114 and use power provided by the battery 120 to output voltage signals so as to generate detection signals induced between the refill and transmit electrodes (Rx) and a receive electrodes (Tx) of touch panel to initiate touch control. The circuit on the control board 114 for calculating coordinates of the capacitive pointer 100 and sensing tip pressure of the capacitive pointer 100 upon the touch panel also uses power provided by the battery 120. The battery 120 and the control board 114 form a closed circuit via the anode elastic strip 122 and the cathode elastic strip of the rea cap 124.

Figure 1B:
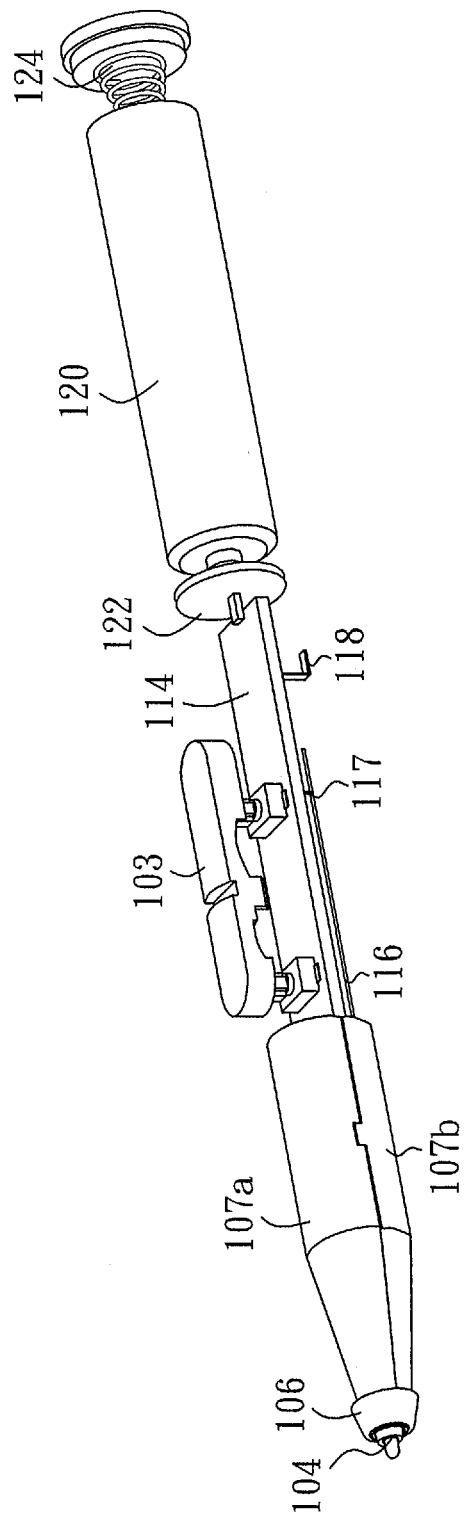
FIG. 1B shows the structure of the capacitive pointer in FIG. 1A with an upper shielding and a lower shielding thereon according to one embodiment of the invention.

FIG. 1B shows the structure of the capacitive pointer in FIG. 1A with an upper shielding and a lower shielding thereon according to one embodiment of the invention. The materials of the upper shielding 107a and the lower shielding 107b comprise tinplate. The upper shielding 107a and the lower shielding 107b are used to shield output signals in the refill, the refill holder 108 and the spring 112 so as to avoid mutual interferences between the output signals in the refill, the refill holder 108 and the spring 112 and the detection signals in the tip cover 106 and the tip cover conductive line 116.

Figure 1C:
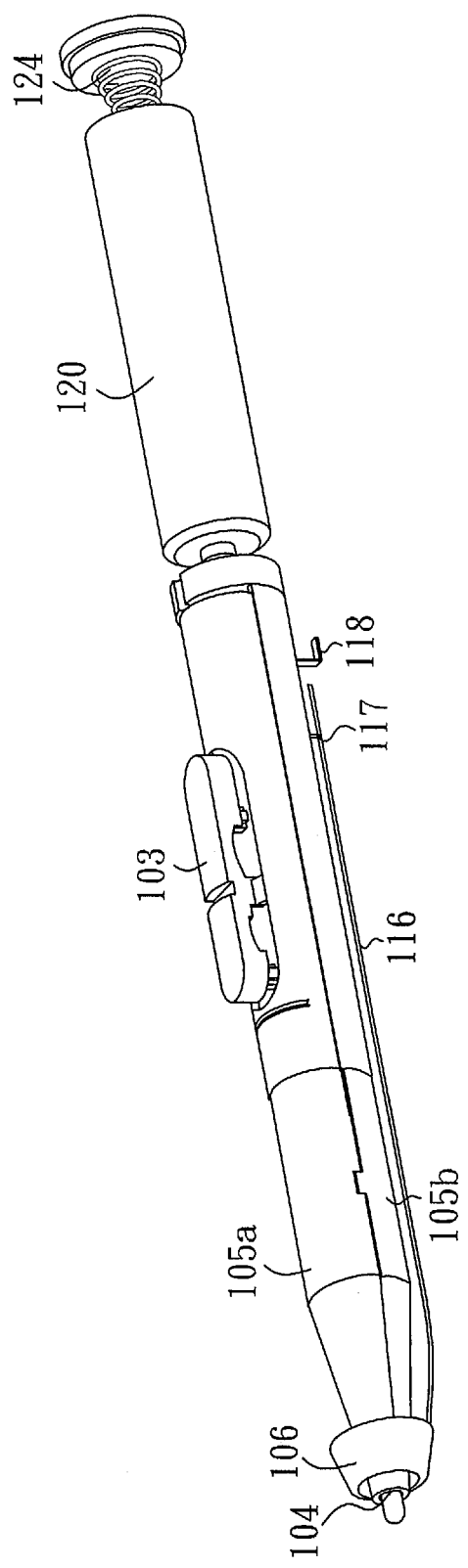
FIG. 1C shows the structure of the capacitive pointer in FIG. 1A with a cover, a control board holder thereon on according to one embodiment of the invention.

FIG. 1C shows the structure of the capacitive pointer in FIG. 1A with a cover, a control board holder thereon according to one embodiment of the invention. The cover 105a and the control board holder 105b are configured to be located i the upper shielding 107a and the lower shielding 107b for securing the control board 114.

Figure 1D:
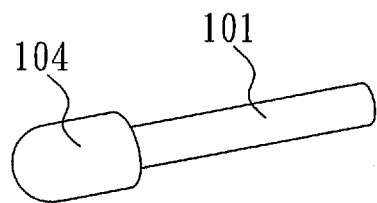
FIG. 1D shows a refill of a capacitive pointer according to one embodiment of the invention.
Figure 1E:
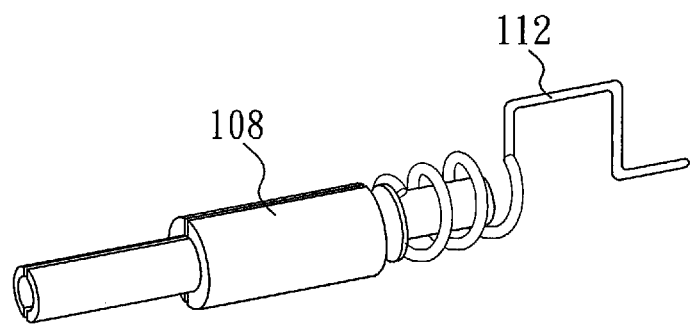
FIG. 1E shows a refill holder of a capacitive pointer according to one embodiment of the invention.

FIG. 1D shows a refill of a capacitive pointer according to one embodiment of the invention. FIG. 1E shows a refill holder of a capacitive pointer according to one embodiment of the invention. The material of the refill 101 comprises metal, such as aluminum. One end of the refill 101 is in the cap 104 while the refill 101 penetrates the hollow refill holder 108 so as to push the refill holder 108 to press the spring 112 to contact the force sensor 110.

The capacitive pointer according to one embodiment of the invention has capacitive touch input functions to meet the requirement of operating a pointer on a capacitive touch control panel.

Although specific embodiments have been illustrated and described, it will be appreciated by those skilled in the art that various modifications may be made without departing from the scope of the present invention, which is intended to be limited solely by the appended claims.

What is claimed is:

1. A capacitive pointer, comprising:
   a refill comprising a conductor;
   a refill holder, the refill penetrating the refill holder;
   a spring surrounding one end of the refill holder;
   a control board, the refill holder and the spring electrically connecting the control board;
   a force sensor soldered on a flexible printed circuit board electrically connected to the control board, the spring bending to detour the force sensor, the refill and the refill holder being able to press the spring to contact the force sensor to detect a tip pressure of the refill;
   an upper shielding and a lower shielding combined to cover the refill, the refill holder and the spring;
   a tip cover electrically connecting the control board, one end of the refill and the upper shielding and the lower shielding penetrating the tip cover; and
   a battery providing an electrical power to the capacitive pointer.

2. The capacitive pointer according to claim 1 further comprising a cap covering one end of the refill.

3. The capacitive pointer according to claim 2, wherein the material of the cap comprises polypropylene.

4. The capacitive pointer according to claim 1, wherein the materials of the tip cover, the refill and the refill holder comprise aluminum.

5. The capacitive pointer according to claim 1, wherein the material of the spring comprises steel.

6. The capacitive pointer according to claim 1 further comprising a cover and a control board holder combined to cover the refill, the refill holder and the spring, and the upper shielding and the lower shielding combined to partially cover the cover and the control board holder.

7. The capacitive pointer according to claim 6, wherein the materials of the cover and the control board holder comprise acrylonitrile butadiene styrene and polycarbonate.

8. The capacitive pointer according to claim 1 further comprising a front tube and a rear tube, and the tip cover, the front tube and the rear tube combined to form a shell of the capacitive pointer.

9. The capacitive pointer according to claim 8, wherein the material of the front tube comprises acrylonitrile butadiene styrene and polycarbonate.

10. The capacitive pointer according to claim 8, wherein the material of the rear tube comprises aluminum.

* * * * *